J. E. WOODBURY.
FOCUSING DEVICE FOR CAMERAS.
APPLICATION FILED JAN. 7, 1915.
1,238,474.
Patented Aug. 28, 1917.
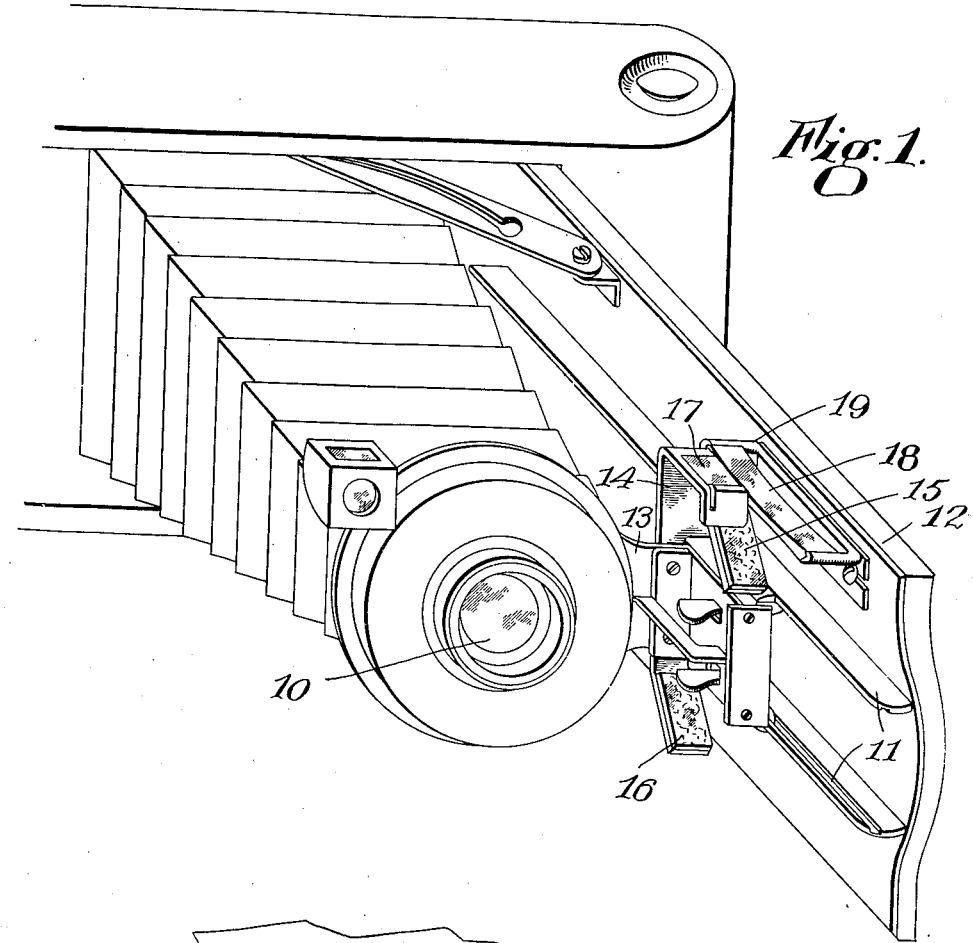
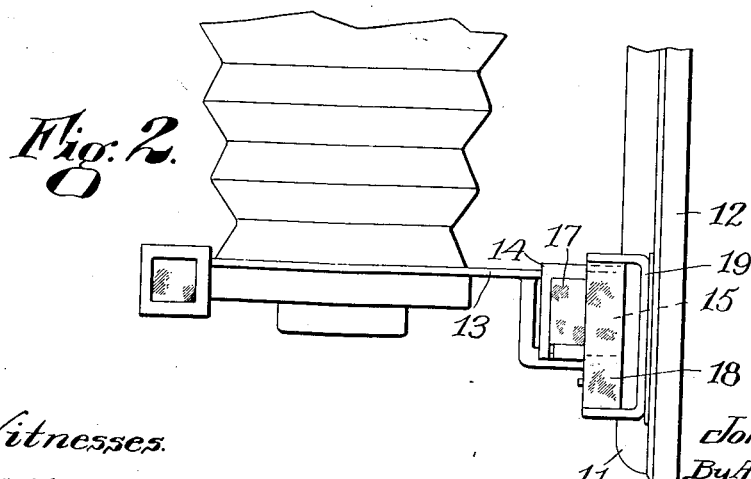

J. E. WOODBURY.
FOCUSING DEVICE FOR CAMERAS.
APPLICATION FILED JAN. 7, 1915.

1,238,474.

Patented Aug. 28, 1917.
2 SHEETS—SHEET 2.

Witnesses.
C. F. Nisson
M. P. Healy

Inventor
John E. Woodbury.
By Attorneys.
Southgate & Southgate.

UNITED STATES PATENT OFFICE.

JOHN E. WOODBURY, OF WORCESTER, MASSACHUSETTS.

FOCUSING DEVICE FOR CAMERAS.

1,238,474.      Specification of Letters Patent.      Patented Aug. 28, 1917.

Application filed January 7, 1915. Serial No. 1,027.

*To all whom it may concern:*

Be it known that I, JOHN E. WOODBURY, a citizen of the United States, residing at Worcester, in the county of Worcester and State of Massachusetts, have invented a new and useful Focusing Device for Cameras, of which the following is a specification.

This invention although capable of other uses is particularly designed for application to a camera for the purpose of ascertaining in a convenient way by an unskilled operator when the camera is in focus.

The particular object of the invention is to provide a device of this character which will operate accurately at certain distances and with comparatively small variations at intermediate distances and which will be of a simple and inexpensive character to make and adjust at the factory; also to provide a construction which will take up little room and can be folded in the camera without trouble.

Reference is to be had to the accompanying drawings in which—

Figure 1 is a perspective view of a camera with a preferred embodiment of this invention applied thereto;

Fig. 2 is a plan of the same;

Figure 3:
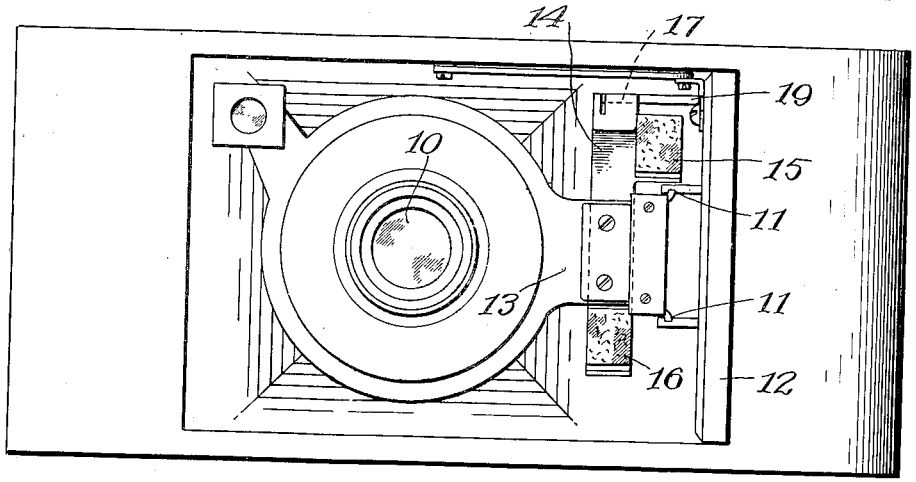
Fig. 3 is a front elevation.

The invention is shown as applied to a camera having a lens 10 rectilinearly movable in a well known way and guided by a pair of parallel guides 11 on a folding cover or plate 12.

For the purpose of indicating when the camera is in focus, the frame 13 which moves with the lens along the guides 11 is provided with means for deflecting two separated rays of light coming from an object on which the camera is to be focused, and bringing them to points which can be observed to ascertain whether or not the images produced are in registration. The object is to so arrange the parts that when the two images are in registration, the camera will be known to be in focus on that point or line.

In the present instance this frame 13 is provided with a supporting plate 14 which carries two inclined reflecting devices in the form of mirrors 15 and 16. These mirrors are in fixed angular relation to each other and are nearly parallel. They are offset from each other by a distance equal to their width so that when the camera is held in the position shown in Fig. 1 the upper mirror 15 is located at one side of the position that would be occupied by an object parallel with the mirror 16 and in the plane of the mirror 15. Also carried by the plate 14 is a lens 17. The two mirrors 15 and 16 and lens 17 are all in fixed relation to each other and to the camera lens 10 and move rectilinearly with it.

Figure 7:
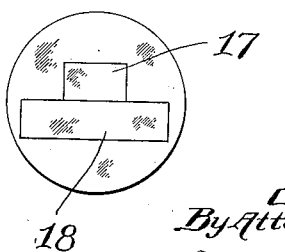
Fig. 7 is a plan of a lens showing how the two lenses of this instrument can be cut from it.

The rest of the device is made up of another lens 18. The lens 18 is carried by a frame 19 secured to the plate 12 and both lenses 17 and 18 are arranged side by side in the same plane and in horizontal position when the camera is held in the position shown in Fig. 1. The relationship between the two lenses 17 and 18 can best be described by stating that the two lenses can be formed by cutting them from a single double concave lens, as shown in Fig. 7. In this way it will be seen that they have the same curvature, and when in central position their surfaces form parts of the same sphere. The lens 17 is in position to receive rays of light reflected from the mirror 16, and the lens 18 to receive those reflected from the mirror 15. The lens 17 constitutes a reducing glass through which to observe an object reflected by the mirror 16. The lens 18 is for deflecting the rays from the mirror 15 out of registration with those observed through the reducing lens 17 when the camera lens is not in focus.

Figures 4, 5, 6:
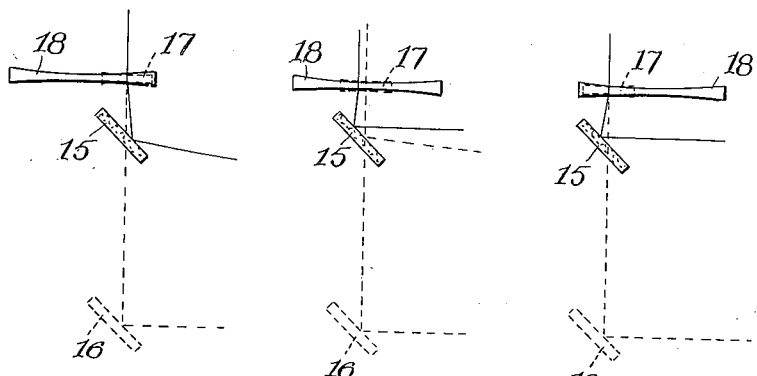
Fig. 4 is a diagrammatic view showing the path of the rays of light at one of the positions of the device when the camera is in focus on a near-by object.
Fig. 5 is a similar view showing the other position when the camera is in focus on a distant object.
Fig. 6 is a similar view showing an intermediate position when the camera is not in focus on either of said objects.

The lens 18 being fixed and the other parts movable with the camera lens, it will be seen that as the camera lens is moved for the purpose of getting the camera into focus, the lens 17 will move along the lens 18, as indicated diagrammatically in Figs. 5 and 6. In the position shown in Figs. 4 and 5 the camera is supposed to be in focus, first on a nearby point as in Fig. 4, and second, on a distant point as in Fig. 5.

Fig. 6 indicates the non-registration of the rays when the camera is not in focus. It will be understood, of course, that the curvature, and position of the lenses 17 and 18 are matters which are controlled by the focal length of the camera lens 10, and the length of the triangular base, and that the deflection of the light is controlled by means which is purely optical and not partially mechanical.

In the use of the device the object is sighted through the usual finder 20 and then a point, or preferably a horizontal line, is selected for observation through the lenses 17 and 18. While the camera is not in focus on this line the images of the line appearing through the two lenses 17 and 18 will be out of registration with each other, as indicated in Fig. 6. The frame 13 is then moved back or forward, as may be necessary, in order to bring these two images into exact registration, either in the position shown in Fig. 4, or that shown in Fig. 5, for example. When this result is secured the camera is exactly in focus and it will be obvious that it can be brought into this condition by an unskilled operator, provided the construction of the focusing device is accurate.

It will be understood, of course, that each construction is so made that it has its greatest accuracy at two definite distances, one a comparatively short distance and the other a larger distance. Nevertheless, the instrument will be comparatively accurate at distances near these and it has been found in practice that it can be used for ordinary work at all intermediate points.

In designing the optical group described, the focal length of the camera lens 10, the focal length of each of the compensator lenses 17 and 18 and the triangulation base line represented by the distance between the mirrors 15 and 16 must be coördinated as follows: in which equation, the first mentioned focal length is represented by F, the other by f and the base line by S. For example, on a camera provided with a lens of 10 cm. focal length, if the mirrors are to be separated 2 cm. the compensator lenses should have focal lengths of 50 cm. The adjustments necessary in setting up the elements can be effected by focusing the camera lens on a distant object and adjusting the mirrors into parallelism with the compensator lenses removed. Then these lenses are put in and one of them adjusted until the setting on the distant object is again correct.

Although I have illustrated and described only a single embodiment of the invention, I am aware of the fact that many modifications can be made therein by any person skilled in the art without departing from the scope of the invention as expressed in the claims. Therefore I do not wish to be limited to all the details of construction herein shown, and described, but what I do claim is:—

1. In a focusing device for a camera, the combination of a pair of light reflecting devices in different planes, a reducing lens in position to permit observation therethrough of one of the reflecting devices, and a second reducing lens of the same curvature as said first mentioned lens arranged in the plane thereof and by its side in position for observation therethrough of the other reflecting device, said reflecting devices and first mentioned reducing lens being together movable relatively to the second lens in a direction parallel with the central plane thereof.

2. In a focusing device for a camera, the combination of a pair of inclined mirrors in fixed angular relation to each other, one being off set from the other, a reducing lens over one mirror, a second reducing lens over the other mirror, one of said lenses being movable in its own plane relatively to the other lens and the mirrors.

3. In a focusing device for a camera, the combination of a pair of inclined mirrors in fixed angular relation to each other, one being offset from the other by a distance equal to its width, a reducing lens over one mirror, a second reducing lens of the same curvature over the other mirror, one of said lenses being movable in its own plane relatively to the other lens and the mirrors for deflecting the rays from its mirror out of registration with those from the other mirror when the camera is not in focus.

4. In a focusing device for a camera, the combination of a pair of light reflecting devices rectilinearly movable with the lens of the camera and arranged to separately reflect two partial images of an object into registering positions, a reducing lens fixed with respect to one of said reflecting devices and in position for observation of it therethrough, and a second lens of the same curvature as said reducing lens arranged in the plane thereof in position for observation of the other reflecting device therethrough, the second lens being elongated in the direction of the motion of the camera lens and being movable relatively to its reflecting device in the said direction.

5. In a focusing device for a camera, the combination of a pair of light reflecting devices arranged to separately reflect two partial images of an object into registering positions, a reducing lens fixed with respect to one of said reflecting devices and in position for observation of it therethrough, and a second reducing lens arranged in the plane thereof, in position for observation of the other deflecting device therethrough, the second lens being elongated in the direction of the motion of the camera lens and being movable relatively to its reflecting device in the said direction.

6. In a photographic focusing device, the combination with a camera embodying a supporting structure for the photographic material and a lens structure, said structures being movable relatively to each other to focus the camera lens, of a pair of substantially parallel relatively fixed mirrors associated with one of said structures and adapted to respectively reflect the components of a complete image and a reducing lens arranged to intercept each component, said lenses being of the same focal length and associated with the respective structures to move relatively to each other in a direction transverse to their axes with the focusing movements of the camera lens.

7. In a photographic focusing device, the combination with a camera embodying a supporting structure for the photographic material and a lens structure, said structures being movable relatively to each other to focus the camera lens, of a pair of substantially parallel relatively fixed mirrors associated with one of said structures and adapted to respectively reflect the components of a complete image and a reducing lens arranged to intercept each component, said lenses being of the same focal length and associated with the respective structures to move relatively to each other in a direction transverse to their axes with the focusing movements of the camera lens, the relation and form of the lenses being such that they occupy the same plane and have a common axis in one position of the movable lens.

8. In a photographic focusing device, the combination with a camera embodying a bed, and a lens carriage movable thereon, of a pair of substantially parallel relatively fixed mirrors mounted on the carriage between the camera lens and bed in an alinement parallel with the latter, and means having a fixed relationship with the bed during focusing movements of the carriage for deflecting a ray reflected by one mirror into or out of parallelism with a ray reflected by the other mirror accordingly as the camera lens is in or out of focus with respect to an object from which both rays emanate.

In testimony whereof I have hereunto set my hand, in the presence of two subscribing witnesses.

JOHN E. WOODBURY.

Witnesses:
ALBERT E. FAY,
C. FORREST WESSON.

---

Correction in Letters Patent No. 1,238,474.

It is hereby certified that in Letters Patent No. 1,238,474, granted August 28, 1917, upon the application of John E. Woodbury, of Worcester, Massachusetts, for an improvement in "Focusing Devices for Cameras," an error appears in the printed specification requiring correction as follows: Page 2, line 46, after the colon insert the formula $fS = F^2$; and that the said Letters Patent should be read with this correction therein that the same may conform to the record of the case in the Patent Office.

Signed and sealed this 20th day of November, A. D., 1917.

[SEAL.]
R. F. WHITEHEAD,
*Acting Commissioner of Patents.*

Cl. 95—44.